UNITED STATES PATENT OFFICE.

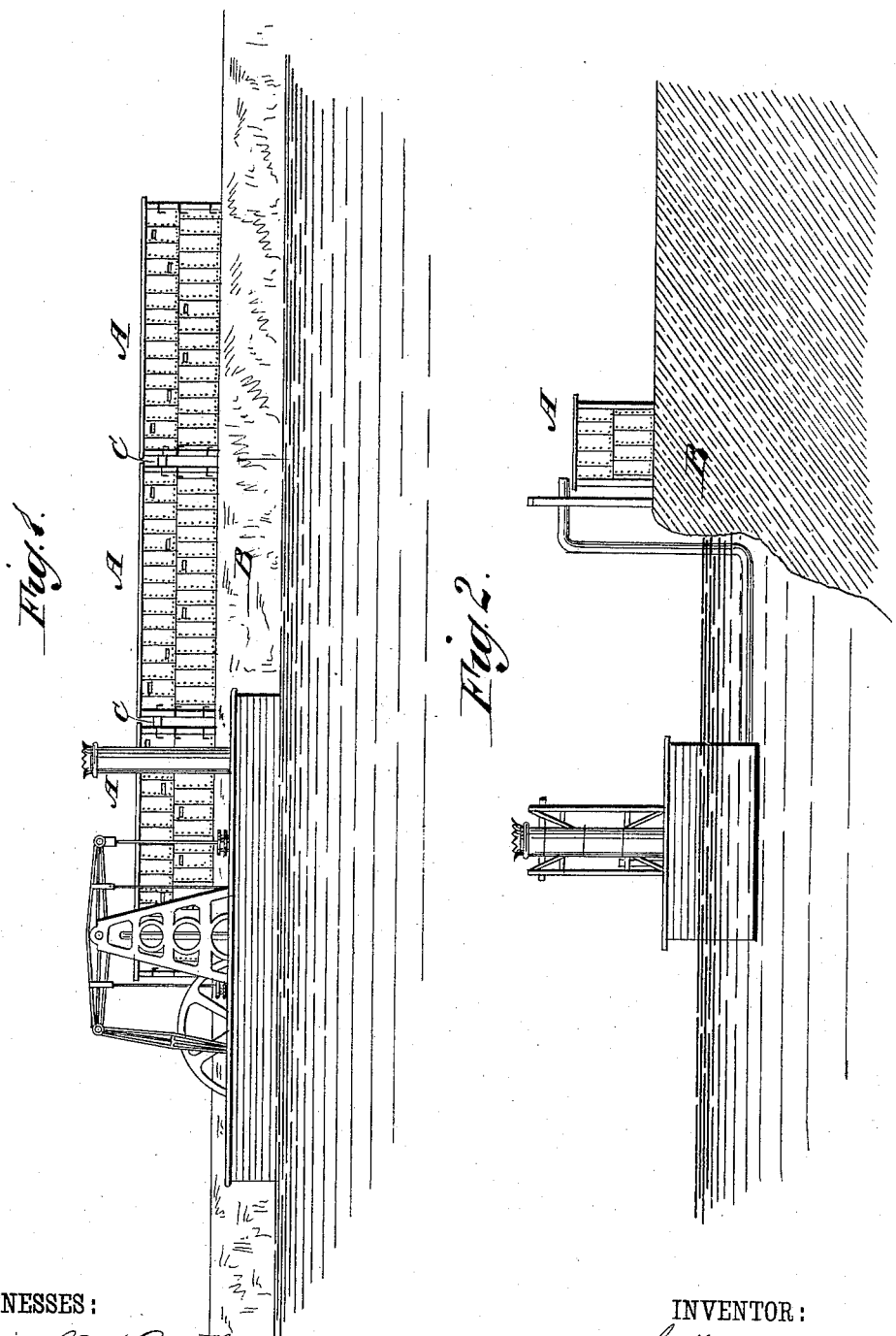

STODDART HOWELL, OF NEW ORLEANS, LOUISIANA.

METHOD OF CONSTRUCTING LEVEES AND EMBANKMENTS.

SPECIFICATION forming part of Letters Patent No. 277,732, dated May 15, 1883.

Application filed July 26, 1882. (No model.)

*To all whom it may concern:*

Be it known that I, STODDART HOWELL, of New Orleans, in the parish of Orleans and State of Louisiana, have invented a new and Improved Method of Constructing Levees and Embankments, of which the following is a full, clear, and exact description.

The object of my invention is to facilitate the construction of levees or shore-embankments.

The invention consists in forming a levee in the manner substantially as hereinafter more fully set forth and claimed.

Reference is to be had to the accompanying drawings, forming a part of this specification, in which similar letters of reference indicate corresponding parts in both the figures.

Figure 1 represents a longitudinal view of a shore on which an embankment is being made according to my improved method. Fig. 2 is a cross-sectional elevation of the same.

A series of boxes or settling-tanks, A, open at the top and bottom, are placed on the shore B of the river, these tanks being connected together by tubes C. The tanks are provided with side openings, which can be closed by suitable swinging or sliding doors or gates. The tanks or boxes are filled with water and sediment from the stream by means of a pump on a scow, or by means of a portable pump on shore, or by means of a hydraulic ram or other suitable device, and the sediment, sand, &c., in the river water is allowed to settle for a day or two, upon which the water is drawn off through the side openings of the tanks. The tanks or boxes are again filled with water, the sediment, &c., again settles, and in this way a levee or embankment is built up, the same consisting of accumulative layers of mud, sand, and other deposits of the water. When the levee or embankment has been completed, the tanks are taken apart, and are removed by means of a derrick or other device and placed on another part of the bank, to be again filled as before.

The boxes or tanks can be made large or small, as may be desired, and as the size of the desired levee may require.

In the above-described manner the levee can be built up very easily at a very low cost, as the material need not be transported any distance.

It is intended that the water for filling the tanks shall be taken from near the bottom of the stream, in order to obtain as much sediment as the water will carry. If necessary the sediment can be stirred to insure its being taken up with the water.

I am aware that it is old to construct levees by damming the water-course to raise the level of the water, and passing it, by means of the pressure thus obtained, through flumes or passages into settling-chambers arranged on the shore.

Having thus described my invention, I claim as new and desire to secure by Letters Patent—

The described method of constructing levees, which consists in taking the water, with its sediment, from near the bottom of the stream or water-course, and passing the same up into a series of settling-tanks open at the top and bottom and placed on the shore, said sediment, &c., being permitted to settle, after which the water is drawn off, and said steps repeated until the levee is built, it being thus constructed of accumulated layers of the mud, sand, and sediment of the water, substantially as set forth.

STODDART HOWELL.

Witnesses:
J. G. EUSTIS,
H. M. HYAMS.